US012122034B2

(12) United States Patent
Chang

(10) Patent No.: US 12,122,034 B2
(45) Date of Patent: Oct. 22, 2024

(54) NAMEPLATE AND TOOL HANGING DEVICE INCLUDING THE SAME

(71) Applicant: CHUN NIEN PLASTIC LTD., Taichung (TW)

(72) Inventor: Chi-Tsai Chang, Taichung (TW)

(73) Assignee: CHUN NIEN PLASTIC LTD., Taichung (TW)

( * ) Notice: Subject to any disclaimer, the term of this patent is extended or adjusted under 35 U.S.C. 154(b) by 0 days.

(21) Appl. No.: 18/075,553

(22) Filed: Dec. 6, 2022

(65) Prior Publication Data

US 2023/0182282 A1 Jun. 15, 2023

(30) Foreign Application Priority Data

Dec. 10, 2021 (TW) ................................ 110214726

(51) Int. Cl.
*B25H 3/06* (2006.01)

(52) U.S. Cl.
CPC ..................................... *B25H 3/06* (2013.01)

(58) Field of Classification Search
CPC .......... B25H 3/003; B25H 3/00; B25H 13/06; B25H 13/56; B25B 21/00; B25B 23/0035; B25B 23/0014
USPC ....... 211/70.6, 13.1, 4, 94.01; 206/378, 349, 206/372, 806, 493, 376, 379, 1.5
See application file for complete search history.

(56) References Cited

U.S. PATENT DOCUMENTS

| | | | | |
|---|---|---|---|---|
| 4,905,829 A * | 3/1990 | Stribiak | A45C 11/24 | 206/349 |
| 5,228,570 A * | 7/1993 | Robinson | B25B 13/56 | 81/177.85 |
| 5,715,951 A * | 2/1998 | Dembicks | B25B 13/56 | 206/378 |
| 6,168,018 B1 * | 1/2001 | Ramsey | B25H 3/06 | 206/378 |
| 6,386,363 B1 * | 5/2002 | Huang | B25H 3/003 | 206/378 |
| 6,431,373 B1 * | 8/2002 | Blick | B25H 3/003 | 206/378 |
| 6,886,791 B2 * | 5/2005 | Dettorre | B63B 32/83 | 211/94.01 |
| 7,066,339 B2 * | 6/2006 | Chiu | A47F 5/0807 | 211/183 |
| 8,499,935 B2 * | 8/2013 | Hsieh | B25H 3/04 | 206/349 |
| 9,138,890 B2 * | 9/2015 | Lee | B25H 3/003 | |
| 9,186,790 B1 * | 11/2015 | Kao | B25H 3/003 | |
| 9,527,206 B1 * | 12/2016 | Hsieh | B25H 3/04 | |
| 9,757,853 B2 * | 9/2017 | Su | B25H 3/04 | |

(Continued)

*Primary Examiner* — Steven A. Reynolds
*Assistant Examiner* — Prince Pal
(74) *Attorney, Agent, or Firm* — MUNCY, GEISSLER, OLDS & LOWE, P.C.

(57) ABSTRACT

A nameplate configured to be connected to a tool hanger including a rail is provided, including: a main body, configured to be connected to the tool hanger, including a marking portion; wherein the main body includes a connection portion, and the connection portion is configured to be slidably mounted to the rail. A tool hanging device including the nameplate is further provided, wherein the tool hanging device further includes the tool hanger including the rail and at least one seat, the at least one seat is slidably disposed on the rail, and the at least one seat is configured for installation of at least one tool.

5 Claims, 4 Drawing Sheets

(56) References Cited

U.S. PATENT DOCUMENTS

| | | | | |
|---|---|---|---|---|
| 9,937,615 | B1 * | 4/2018 | Winnard | B25H 3/04 |
| 10,272,547 | B1 * | 4/2019 | Lai | B25B 13/06 |
| 10,675,750 | B1 * | 6/2020 | Winnard | G09F 3/02 |
| 11,091,778 | B2 * | 8/2021 | Winnard | A61K 39/12 |
| 11,358,271 | B2 * | 6/2022 | Chang | B25H 3/003 |
| 11,389,945 | B1 * | 7/2022 | Kao | B25H 3/04 |
| 11,453,113 | B1 * | 9/2022 | Hsieh | B25H 3/06 |
| 11,667,029 | B1 * | 6/2023 | Hsieh | B25H 3/04 206/372 |
| 2005/0221664 | A1 * | 10/2005 | Winnard | B25H 3/003 439/510 |
| 2006/0234846 | A1 * | 10/2006 | Tucker | B25H 3/04 483/26 |
| 2007/0017886 | A1 * | 1/2007 | Kao | A47F 7/0028 211/94.01 |
| 2009/0001111 | A1 * | 1/2009 | Lin | B25H 3/003 224/245 |
| 2009/0211932 | A1 * | 8/2009 | Schmitt | B25H 3/003 206/373 |
| 2011/0233160 | A1 * | 9/2011 | Chen | B25H 3/06 211/70.6 |
| 2015/0165615 | A1 * | 6/2015 | Lee | B25H 3/003 206/349 |
| 2016/0096264 | A1 * | 4/2016 | Kao | B25H 3/06 206/378 |
| 2016/0221178 | A1 * | 8/2016 | Hsieh | B25F 1/04 |
| 2016/0271788 | A1 * | 9/2016 | Hsieh | B25H 3/04 |
| 2020/0101590 | A1 * | 4/2020 | Winnard | B25H 3/003 |
| 2020/0147780 | A1 * | 5/2020 | Kukucka | B25H 3/003 |
| 2020/0384631 | A1 * | 12/2020 | Reed | B25H 3/04 |
| 2020/0406447 | A1 * | 12/2020 | Hsieh | B25H 3/04 |
| 2021/0339376 | A1 * | 11/2021 | Winnard | B25H 3/04 |
| 2022/0097223 | A1 * | 3/2022 | Chang | B25H 3/003 |

* cited by examiner

NAMEPLATE AND TOOL HANGING DEVICE INCLUDING THE SAME

BACKGROUND OF THE INVENTION

Field of the Invention

The present invention relates to a nameplate and a tool hanging device including the same.

Description of the Prior Art

Some hand tools can be applied to various workpiece by using additional sockets. Therefore, tools such as sockets can be sold independently. Generally, this kind of tools or the like are displayed on a hanger for exhibition for sale.

Nowadays, the brand represents the quality and uniqueness of the product(s), so there are brand logos on the hangers for consumers to quickly identify. However, in the past, the brand logos were directly printed on the hangers, which are easy to fall off due to touch of users. As a result, the brand logo is unclear and difficult to identify. There is another kind of hanger having problem of small area for printing the brand logo or located in an inconspicuous area.

The present invention is, therefore, arisen to obviate or at least mitigate the above-mentioned disadvantages.

SUMMARY OF THE INVENTION

The main object of the present invention is to provide a nameplate and a tool hanging device including the same, which is easy to install, simple in structure, conspicuous and artistic.

To achieve the above and other objects, a nameplate configured to be connected to a tool hanger including a rail is provided, including: a main body, configured to be connected to the tool hanger, including a marking portion; wherein the main body includes a connection portion, and the connection portion is configured to be slidably mounted to the rail.

To achieve the above and other objects, a tool hanging device including the nameplate is further provided, wherein the tool hanging device further includes the tool hanger including the rail and at least one seat, the at least one seat is slidably disposed on the rail, and the at least one seat is configured for installation of at least one tool.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
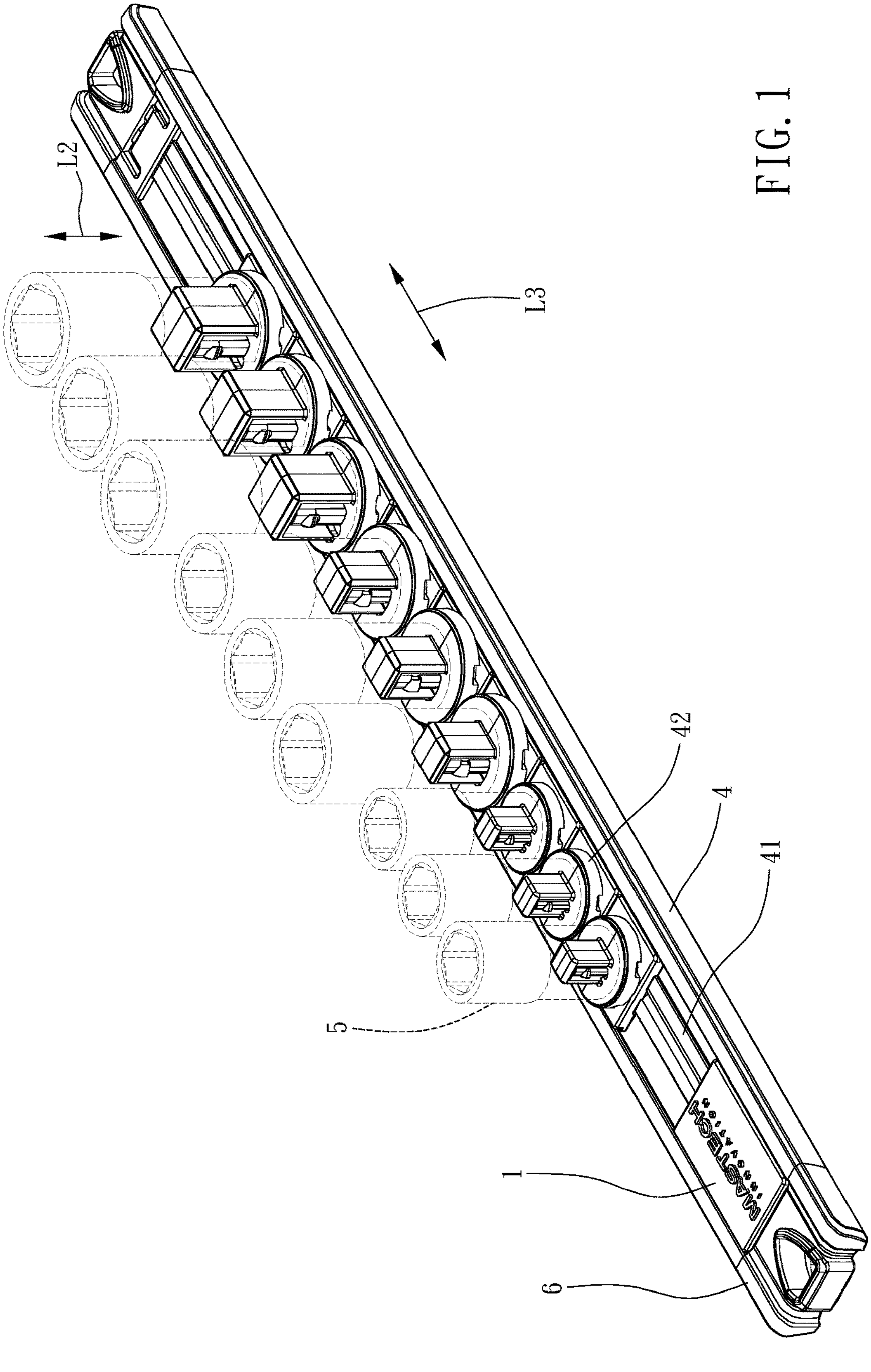
FIG. 1 is a stereogram of a preferable embodiment of the present invention.
Figure 2:
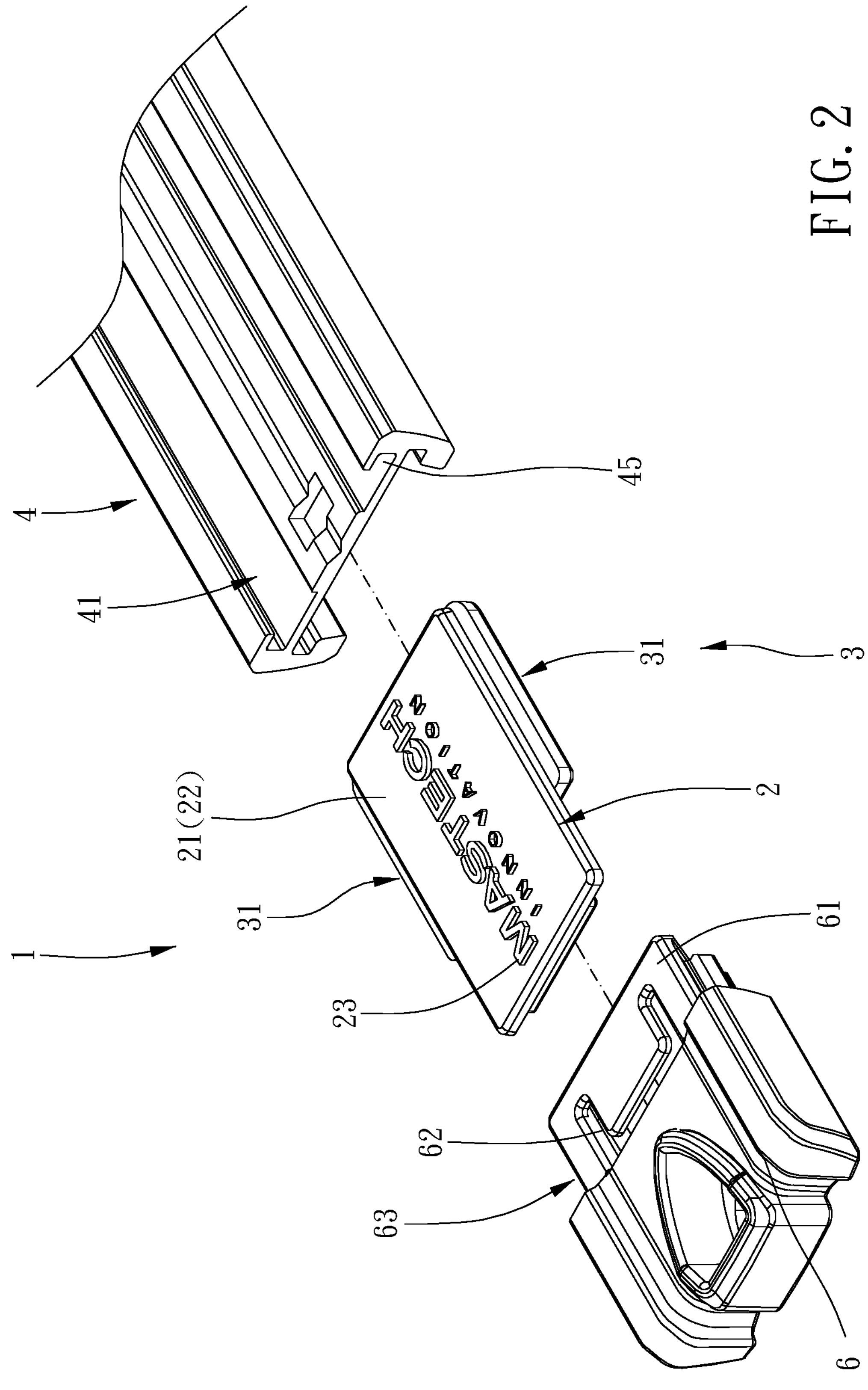
FIG. 2 is a breakdown drawing of a preferable embodiment of the present invention.
Figure 3:
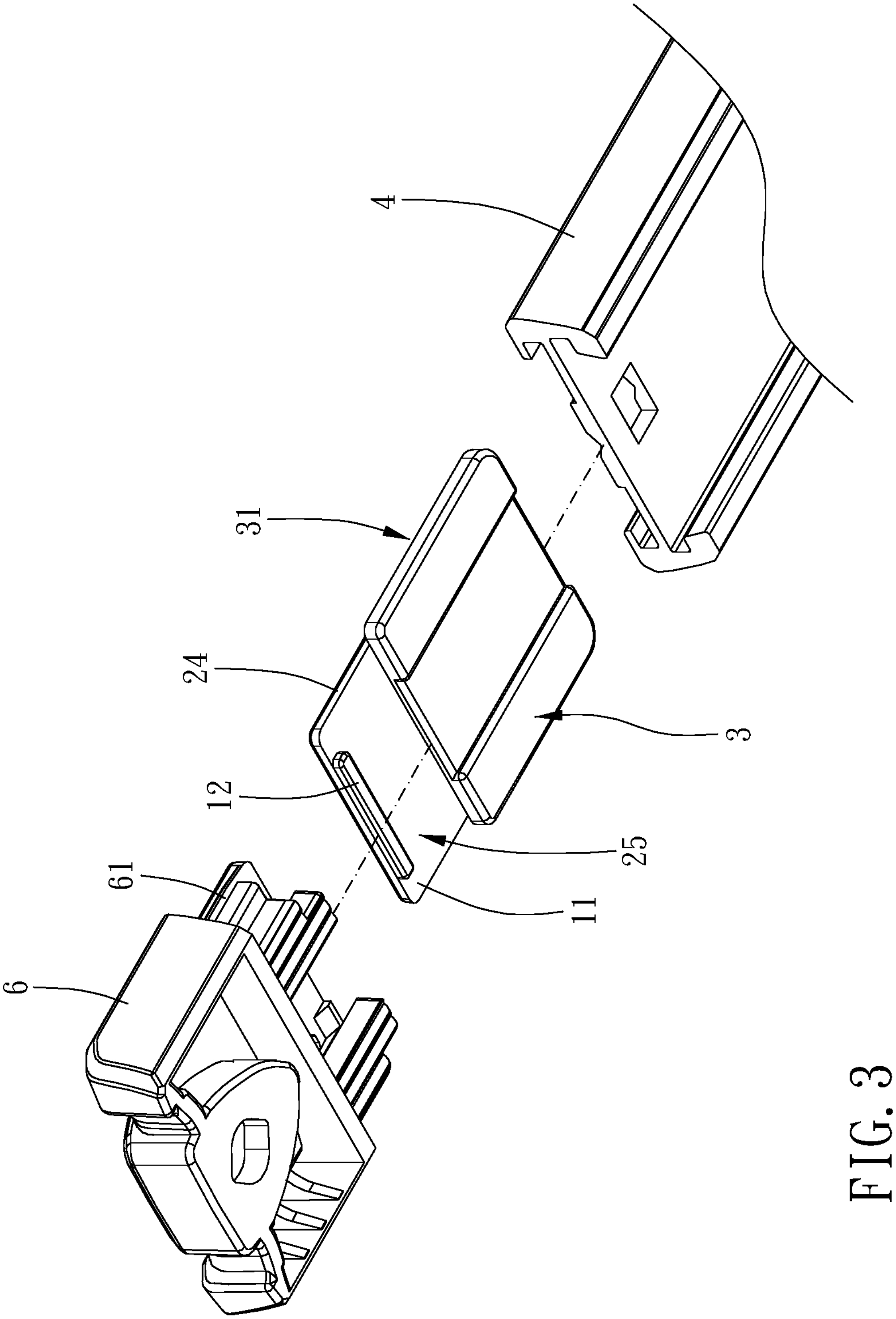
FIG. 3 is another breakdown drawing of a preferable embodiment of the present invention.
Figure 4:
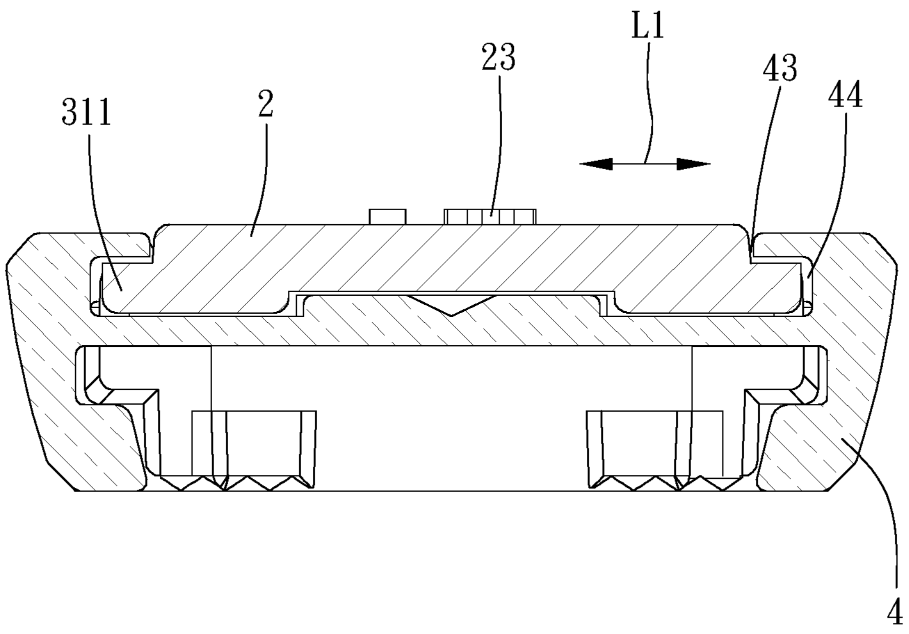
FIG. 4 is a cross-sectional view of a preferable embodiment of the present invention.
Figure 5:
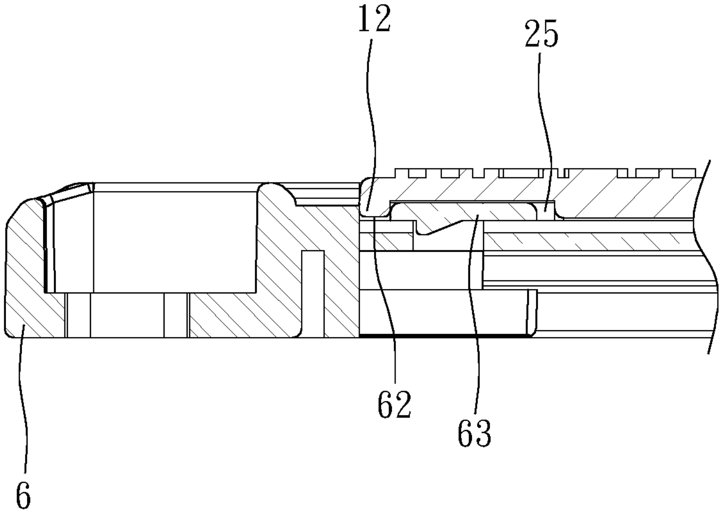
FIG. 5 is another cross-sectional view of a preferable embodiment of the present invention.

Please refer to FIGS. 1 to 5 for a preferable embodiment of the present invention. A nameplate configured to be connected to a tool hanger 4 according to the present invention is provided. The tool hanger 4 includes a rail 41 and at least one seat 42, the at least one seat 42 is slidably disposed on the rail 41, the at least one seat 42 is configured for installation of at least one tool 5, and the nameplate includes a main body 1.

The main body 1 is configured to be connected to the tool hanger 4, and the main body 1 includes a marking portion 2. The main body 1 further includes a connection portion 3, and the connection portion 3 is slidably mounted to the rail 41. The connection portion 3 includes at least one first rail unit 31, and the at least one first rail unit 31 is configured to be slidably mounted to at least one second rail unit 45 of the rail 41. Preferably, the connection portion 3 includes two first rail units 31, and the two first rail units 31 are located at opposing sides of the marking portion 2. One of the at least one first rail unit 31 and the at least one second rail unit 45 includes at least one sliding slot, the other of the at least one first rail unit 31 and the at least one second rail unit 45 includes at least one wing portion 311, and the at least one wing portion 311 is received within the at least one sliding slot. In this embodiment, the two first rail units 31 includes two wing portions 311, the two wing portions 311 project from opposing sides of the marking portion 2, the rail 41 includes two second rail units 45, and each of the two second rail units 45 includes one of the at least one sliding slot. As such, the nameplate can be directly installed on the rail 41 without the need to design an additional structure on the tool hanger 4, so it is simple, replaceable and conspicuous and artistic. In addition, the nameplate can be stably and smoothly installed on the rail 41 and can be moved to be located in an appropriate position according to needs.

The two first rail units 31 are arranged in a first direction L1, the marking portion 2 includes a top portion 21, the top portion 21 is protrusive beyond the two first rail units 31 in a second direction L2, the top portion 21 is configured to be received in a small diameter slot 43 of the rail 41, the connection portion 3 is configured to be received in a large diameter slot 44 of the rail 41 and slidable in a sliding direction L3, the large diameter slot 44 includes two second rail units 45, the second direction L2 is transverse to the first direction L1 and the sliding direction L3, and the first direction L1 is transverse to the sliding direction L3. The main body 1 can slide smoothly without deflection, and it prevents the main body 1 from coming off the rail 41 in the second direction L2. In the sliding direction L3, the main body 1 has an extent smaller than an extent of the rail 41. Preferably, the marking portion 2 is projective beyond the small diameter slot 43 of the rail 41, which is easy to move the marking portion 2 to drive the main body 1.

The marking portion 2 includes a top surface 22 and a recognition structure 23, the top surface 22 is disposed on a side of the marking portion 2 facing away relative to the rail 41, and the recognition structure 23 protrudes from the top surface 22. The recognition structure 23 is projective beyond the small diameter slot 43 of the rail 41 to form a stereoscopic structure, so it is advantageous to recognize the recognition structure 23 by touch in a dark or narrow environment. The recognition structure 23 includes at least one of a pattern and a text. It is noted that the recognition structure 23 may be a recessed structure, concave structure, printed structure or the like.

The connection portion 3 is slidable relative to the rail 41 in the sliding direction L3, the main body 1 includes a bottom side 11, the bottom side 11 includes a first positioning portion 12, the bottom side 11 faces toward a top wall 61 of an end cover 6 of the tool hanger 4, the end cover 6 is disposed on a side of the rail 41, the top wall 61 faces toward a direction transverse to the sliding direction L3, the top wall 61 includes a second positioning portion 62, the first positioning portion 12 is configured to be disengageably positioned to the second positioning portion 62, and the main body 1 is configured to block the end cover 6 in the sliding direction L3. In this embodiment, the first positioning portion 12 is a projection, and the second positioning portion 62 is a recess. In other embodiments, the first positioning portion and the second positioning portion may be both a projection. Specifically, the marking portion 2 includes a protruding section 24, the protruding section 24 is projective beyond the connection portion 3 in the sliding direction L3, the protruding section 24 and the connection portion 3 have a height difference and form a receiving space 25 therebetween, and the receiving space 25 is configured to receive an insertion portion 63 of the end cover 6 of the tool hanger 4. The top wall 61 is disposed on the insertion portion 63. As such, the main body 1 can be stably positioned without relative slide to the rail 41; and the protruding section 24 can be deformed by an external force, thereby making the first positioning portion 12 separate from or combined with the second positioning portion 62. In this embodiment, the main body 1 is made of plastic.

The present invention further provides a tool hanging device. The tool hanging device includes the nameplate aforementioned and further includes a tool hanger 4.

The tool hanger 4 includes a rail 41 and at least one seat 42, the at least one seat 42 is slidably disposed on the rail 41, the at least one seat 42 is configured for installation of at least one tool.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A nameplate configured to be connected to a tool hanger including a rail, including:

a main body, configured to be connected to the tool hanger, including a marking portion;

wherein the main body includes a connection portion, and the connection portion is configured to be slidably mounted to the rail;

wherein the connection portion includes at least one first rail unit, and the at least one first rail unit is configured to be slidably mounted to at least one second rail unit of the rail;

wherein the at least one first rail unit includes two first rail units, and the two first rail units are located at opposing sides of the marking portion;

wherein the two first rail units are arranged in a first direction, the marking portion includes a top portion, the top portion is protrusive beyond the two first rail units in a second direction, the top portion is configured to be received in a small diameter slot of the rail, the connection portion is configured to be received in a large diameter slot of the rail and slidable in a sliding direction, the large diameter slot includes the at least one second rail unit which includes two second rail units, the second direction is transverse to the first direction and the sliding direction, and the first direction is transverse to the sliding direction.

2. The nameplate of claim 1, wherein one of the at least one first rail unit and the at least one second rail unit includes at least one sliding slot, the other of the at least one first rail unit and the at least one second rail unit includes at least one wing portion, and the at least one wing portion is received within the at least one sliding slot.

3. The nameplate of claim 1, wherein the marking portion includes a top surface and a recognition structure, the top surface is disposed on a side of the marking portion facing away relative to the rail, and the recognition structure protrudes from the top surface.

4. The nameplate of claim 1, wherein the two first rail units includes two wing portions, the two wing portions project from opposing sides of the marking portion, each of the two second rail units includes one of the at least one sliding slot; the marking portion includes a top surface and a recognition structure, the top surface is disposed on a side of the marking portion facing away relative to the rail, and the recognition structure protrudes from the top surface; the recognition structure is projective beyond the small diameter slot of the rail; the marking portion is projective beyond the small diameter slot of the rail; the marking portion includes a protruding section, the protruding section is projective beyond the connection portion in the sliding direction, the protruding section and the connection portion have a height difference and form a receiving space therebetween, the receiving space is configured to receive an insertion portion of an end cover of the tool hanger; the connection portion is slidable relative to the rail in a sliding direction, the main body further includes a bottom side, the bottom side includes a first positioning portion, the bottom side faces toward a top wall of the end cover of the tool hanger, the end cover is disposed on a side of the rail, the top wall faces toward a direction transverse to the sliding direction, the top wall includes a second positioning portion, the first positioning portion is configured to be disengageably positioned to the second positioning portion, and the main body is configured to block the end cover in the sliding direction; the top wall is disposed on the insertion portion; the recognition structure includes at least one of a pattern and a text; in the sliding direction, the main body has an extent smaller than an extent of the rail.

5. A tool hanging device, including the nameplate of claim 1, further including:

the tool hanger including the rail and at least one seat, the at least one seat being slidably disposed on the rail, the at least one seat being configured for installation of at least one tool.

* * * * *